United States Patent [19]
Knight et al.

[11] Patent Number: 5,029,947
[45] Date of Patent: Jul. 9, 1991

[54] BRAKING SYSTEMS FOR ARTICULATED VEHICLES

[75] Inventors: Michael D. Knight, Birmingham; Philip A. Taft, West Midlands, both of England

[73] Assignee: Lucas Industries, Public Limited Company, England

[21] Appl. No.: 485,424

[22] Filed: Feb. 27, 1990

[30] Foreign Application Priority Data

Mar. 8, 1989 [GB] United Kingdom ................ 8905251

[51] Int. Cl.$^5$ .............................................. B60T 13/00
[52] U.S. Cl. ...................... 303/7; 188/112 R; 303/22.1; 303/100; 280/432; 280/446.1
[58] Field of Search ...................... 303/7, 15, 20, 22.1, 303/9.62, 9.69, 100, 112, 115, DIG. 3; 188/3 R, 112, 195; 280/423.1, 433, 432, 446.1

[56] References Cited

U.S. PATENT DOCUMENTS 3,759,545  9/1973  McKethan ........................ 188/3 R
4,093,265  6/1978  Hodge ........................... 188/112 R
4,768,840  9/1988  Sullivan et al. .................... 303/100

FOREIGN PATENT DOCUMENTS 2084271  4/1982  United Kingdom ............... 303/22.1

Primary Examiner—Douglas C. Butler
Attorney, Agent, or Firm—Baker, Maxham, Jester & Meador

[57] ABSTRACT

The fifth wheel of an articulated vehicle comprising the coupling between a semi-trailer and a tractor is provided with measuring apparatus for measuring forces imparted from the semi-trailer. The apparatus comprises a sensing device for measuring horizontal loads, and a sensing device for measuring vertical loads. The signals from the sensing devices and are fed into an electronic controller, in turn to cause the brakes on the trailer to be applied to achieve balanced braking, anti-lock control, and traction control of the wheels. A tractor fitted with a braking system of the brake-by-wire type with a conventional semi-trailer, without modifications to semi-trailer or to the braking components of the semi-trailer can therefore be used.

9 Claims, 3 Drawing Sheets

BRAKING SYSTEMS FOR ARTICULATED VEHICLES

This invention relates to braking systems for articulated vehicles, such articulated vehicles being of the kind in which a tractor is coupled to a semi-trailer by a coupling mechanism generally known as a "fifth wheel".

In braking systems for articulated vehicle brakes are provided on the wheels of the semi-trailer, and the semi-trailer is provided with fluid pipe lines through which brake-applying fluid is supplied to the brakes. The remainder of the components of the system are incorporated in the tractor with detachable couplings being provided between the pipe lines on the semi-trailer and complementary supply lines on the tractor.

When the braking system is of the brake-by-wire type it may be necessary to equip the semi-trailer with electronic wheel speed and load sensors from which signals are fed to a controller in order automatically to control the behaviour of the brakes on the semi-trailer to provide balanced braking, anti-lock, and traction control. The provision of such sensors on the semi-trailer adds to the complexity and cost of the system.

Swiss Patent No. 583110 discloses a trailer braking system in which a transducer fitted into a coupling mechanism between a traction vehicle and a trailer produces electrical signals whose magnitude is related to the force on the coupling. Circuits amplify the signals and use them for controlling brakes on the trailer.

It is also known, for example from U.S. Pat. Nos. 3854540 and 4103752, to adapt the fifth wheel for use as weighing means to measure the weight of the semi-trailer.

According to our invention in a braking system for articulated vehicles of the kind set forth the fifth wheel coupling mechanism is provided with measuring apparatus for measuring forces imparted from the semi-trailer, the measuring apparatus comprising first sensing means, and second sensing means separate from the first sensing means for measuring forces in two directions normal to each other respectively, namely forces in opposite directions in a generally horizontal plane dependent upon acceleration/deceleration forces between the tractor and the semi-trailer, and forces in opposite directions in a substantially vertical plane generally normal to the horizontal plane and dependent upon the weight of the semi-trailer.

The signals sensed by the two separate sensing means are fed into a electronic controller which in accordance with the signals sensed, emits electrical currents to cause the brakes on the semi-trailer to be applied to achieve balanced braking, anti-lock control, and traction control of the wheels of the semi-trailer.

This enables us to use a conventional semi-trailer with a tractor fitted with a braking system of the brake-by-wire type with the brakes of the semi-trailer being adapted to be operated as described above, without modifications to the semi-trailer or to the braking components of the semi-trailer.

In one construction in which the fifth wheel comprises a tow plate mounted on the frame of the tractor for limited rocking movement about a transverse axis normal to the main fore-and-aft axis of the tractor, and a pivot pin extending from the forward end of the semi-trailer is received within a notch in the tow plate at its rearward end, aligned pivot pins at opposite sides of the plate which together define the transverse axis are each mounted in a respective mounting assembly of which each assembly is constructed and arranged to define a respective one of the first and second sensing means.

Each assembly comprises a compliance arrangement. This enables the horizontal and vertical movements to be measured by the respective sensing means. For example, we can use load/cell strain gauge technology or, by introducing spring deflection into each compliance arrangement, we can measure such deflection when forces are applied and resisted.

Some embodiments of our invention are illustrated in the accompaning drawings in which.

Figure 1:
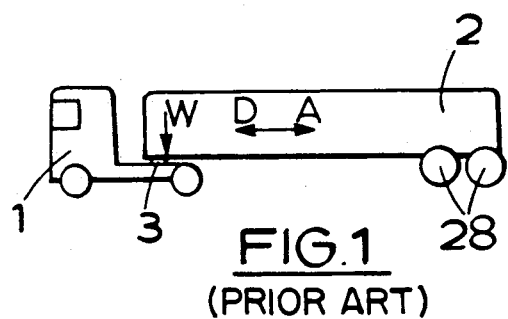
FIG. 1 is a side view of a articulated vehicle including a fifth wheel coupling mechanism.

In the articulated vehicle illustrated in FIGS. 1 of the drawings, a semi-trailer 2 is coupled to a tractor 1 by means of a fifth wheel coupling mechanism 3.

The fifth wheel coupling mechanism 3 comprises a tow plate 4 having a Vee-shaped notch in its rearward end which receives a tow pin extending from the forward end of the semi-trailer 2.

The tow plate 4 is pivotally mounted on opposite sides for limited rocking movements in spaced mounting assemblies 5 and 6. The assembly 5 is adapted to measure horizontal loads (AD) of the semi-trailer 2 with respect to the tractor 1, and the assembly 6 is adapted to measure vertical loads W.

As illustrated the mounting assembly 5 comprises a block 7 secured to the frame 8 of the tractor 1. A lever 9 of the first order is adapted to pivot at an intermediate point in its length about a fulcrum defined by a transverse pivot pin 10 in the block 7 and, at a point aligned vertically above the pivot pin 10, the lever 9 carries a central pivot pin 11 forming a pivotal connection with that side of the tow plate 4. Rocking movement of the lever 9 about the fulcrum 10 is restrained by springs 12 and 13 acting between the frame 8 and arms of the lever 9 on opposite sides of the fulcrum 10. A travel transducer 14 acts between the forward end of the lever 9 and the frame 8.

When a horizontal load (AD) is incurred the central pivot pin 11 tends to be displaced in a generally horizontal direction which, in turn, causes the lever 9 to tend to rock about the fulcrum 10 and any such rocking movement is measured by the travel transducer 14.

The mounting assembly 6 comprises a block 20 which is secured to the frame 8 of the tractor 1. A lever 21 of the third order pivotally connected at one end to the block 20 by means of a pivot pin 22 extends towards the rearward end of the tow plate 4. A transverse centre pin 23 aligned axially with the pin 11 provides a pivotal connection between that side of the plate 4 and an intermediate point in length of the lever 21. A spring 24 acts between the lever 21 adjacent to its free end and the frame 8, and a travel transducer 25 acts between the free end of the lever 21 and the frame 8.

When a vertical load (W) is incurred the lever 21 tends to pivot about the fulcrum 22 against the load in the spring 24, any such movement is measured by the travel transducer 25.

Signals sensed by the transducer 14 and 25 are transmitted to an electronic control module 26 incorporated in a brake-by-wire fluid pressure operated braking system of the tractor. This distinguishes and differentiates the signals from the two transducers 14 and 25 to control the behaviour of the brakes 27 on wheels 28, 29 of the semi-trailer in order to achieve balanced braking, anti-lock control, and traction control as necessary by operation of a brake-pressure modulator 30.

In a modification the travel transducers 14 and 25 could be replaced by load cells.

A practical version of the fifth wheel described above is illustrated in FIGS. 4–8 of the accompanying drawings in which the Vee-shaped notch is indicated at 35, and the tow pin by reference numeral 36.

In the version of FIGS. 4–8, the springs 12 and 13 comprises the oppositely extending arms 40,41 of a leaf spring assembly 42 of which a central portion 43 is clamped to the frame 8.

Similarly the spring 24 comprises a leaf spring 45.

Figure 2:
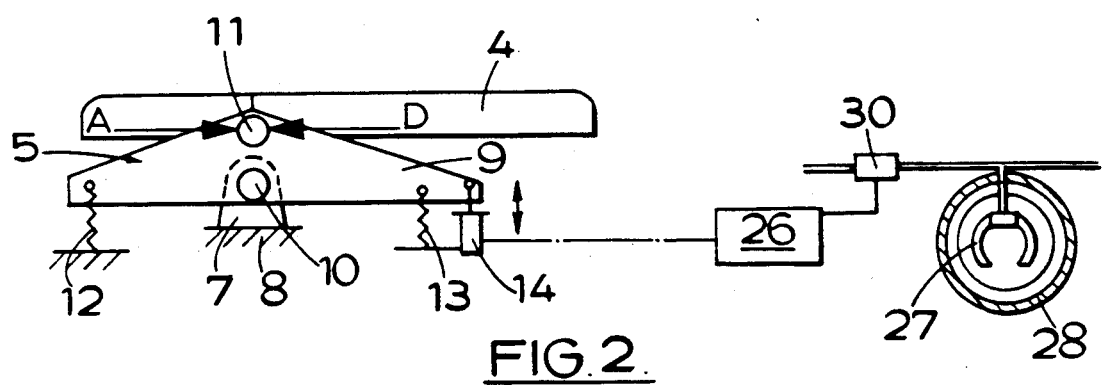
FIG. 2 is a schematic view of one side of the fifth wheel.
Figure 3:
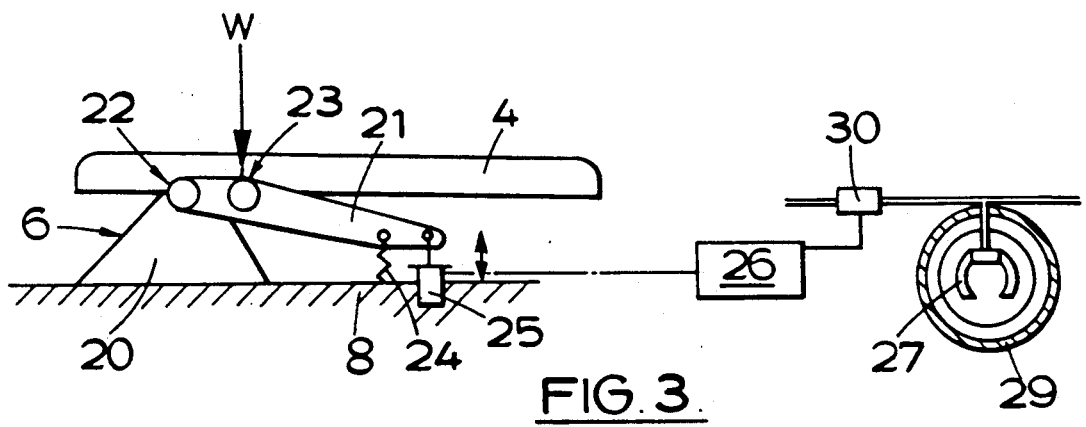
FIG. 3 is a schematic view of the other side of the fifth wheel.
Figure 4:
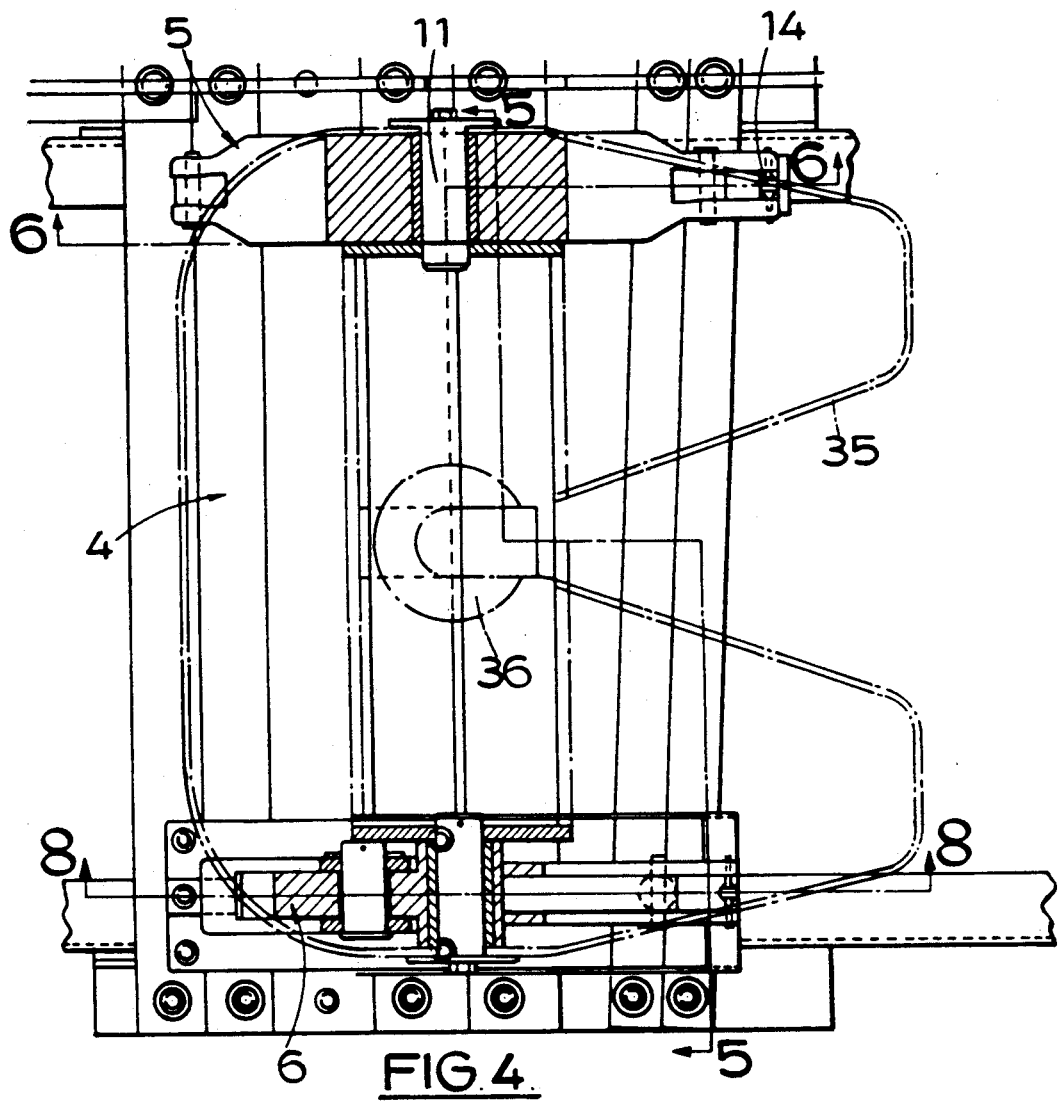
FIG. 4 is a plan of a practical embodiment of a fifth wheel.
Figure 6:
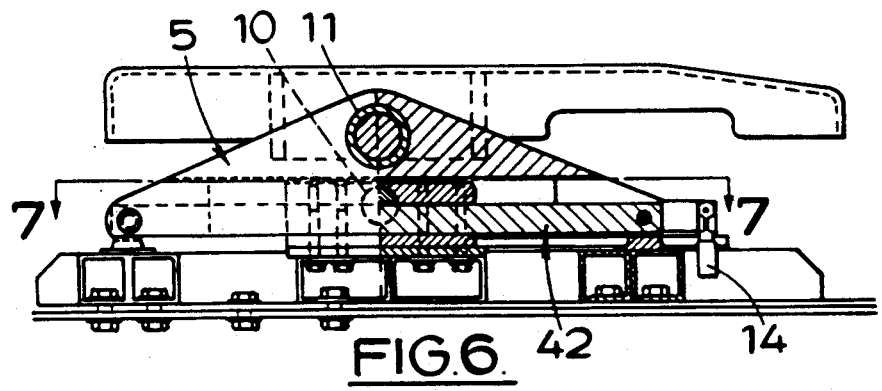
FIG. 6 is a section on the line 6—6 of FIG. 4.
Figure 7:
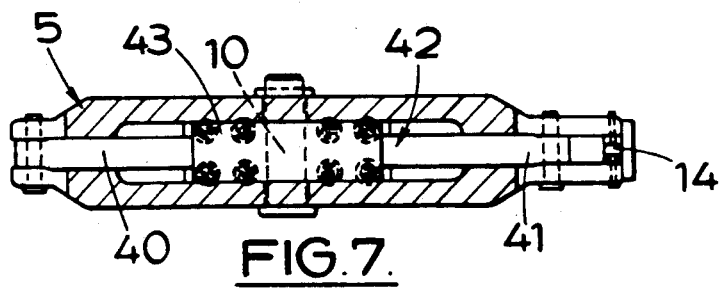
FIG. 7 is a section on the line 7—7 of FIG. 6.
Figure 5:
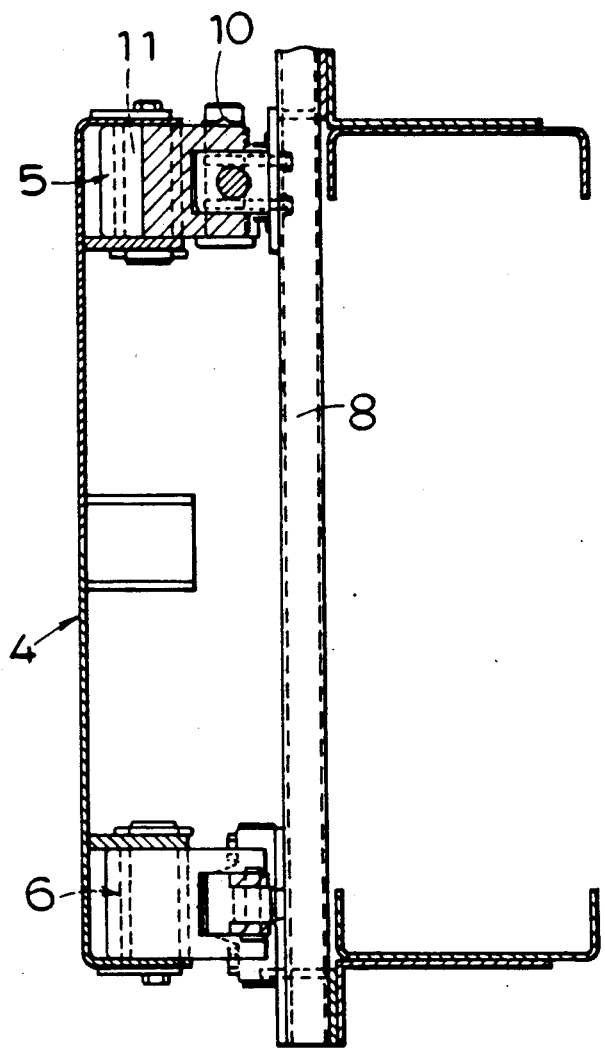
FIG. 5 is a section on the line 5—5 of FIG. 4.
Figure 8:
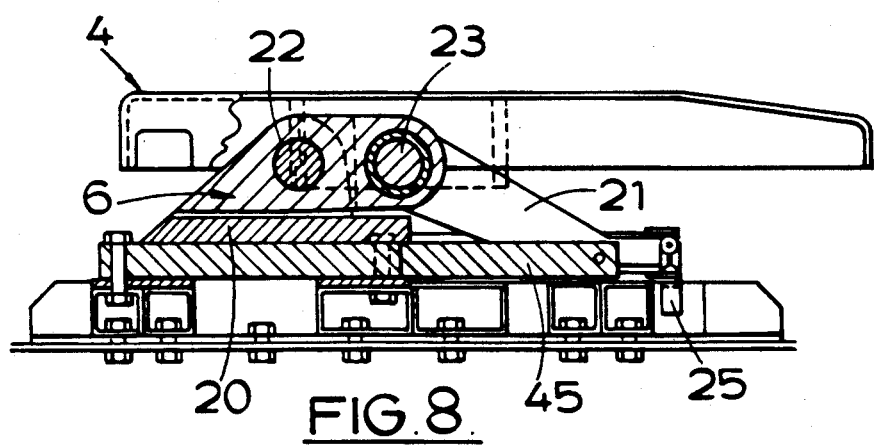
FIG. 8 is a section on the line 8—8 of FIG. 4.

The construction and operation of the fifth wheel of FIGS. 4–8 is otherwise the same as that of FIGS. 1-3 and corresponding reference numerals have been applied to corresponding parts.

We claim:

1. A braking system for an articulated vehicle of the type comprising a tractor, a semi-trailer, a fifth wheel coupling mechanism for coupling said tractor to said semi-trainer, and brakes on wheels of said semi-trailer, said fifth wheel coupling mechanism comprising a tow plate having a notch at the forward end thereof, means for mounting said two plate on said tractor for limited rocking movement about a transverse axis normal to a main fore-and-aft axis of said tractor, and a pivot tow pin extending from said semi-trailer received within said notch in said tow plate, wherein said fifth wheel coupling mechanism is provided with measuring apparatus for measuring forces imparted from said semi-trailer, said measuring apparatus comprising first sensing means, and second sensing means separate from said first sensing means, said first sensing means and said second sensing means being adapted to measure forces in two directions normal to each other respectively, namely forces in opposite directions in a generally horizontal plane dependent upon acceleration/deceleration forces between said tractor and said semi-trailer, and forces in opposite directions in a substantially vertical plane generally normal to said horizontal plane and dependent upon the weight of said semi-trailer, and wherein said transverse axis is defined by aligned first and second pivot pins at opposite sides of said two plate, said first sensing means comprising a first mounting assembly, said second sensing means comprising a second mounting assembly, said first pivot pin being mounted in said first mounting assembly, and said second pivot pin being mounted in said second mounting assembly.

2. A braking system according to claim 1, including an electronic controller, wherein signals sensed by said separate sensing means are fed into said electronic controller which, in accordance with said signals sensed, emits electrical currents to cause said brakes on said semi-trailer to be applied to achieve balanced braking, anti-lock control, and traction control of said wheels of said semi-trailer.

3. A braking system according to claim 1, wherein each said assembly comprises a compliance arrangement.

4. A braking system according to claim 1, wherein said first assembly comprises a first lever of the first order acting on said first sensing means, and said second assembly comprises a second lever of the third order acting on said second sensing means.

5. A braking system according to claim 4, wherein rocking movement of said first lever about a fulcrum is restrained by first resilient means, and rocking movement of said second lever is restrained by second resilient means.

6. A braking system according to claim 5, wherein at least one of said resilient means comprises a tension spring.

7. A braking system according to claim 5, wherein at least one of said resilient means comprises a leaf spring.

8. A braking system according to claim 1, wherein said first and said second sensing means comprise travel transducers.

9. A braking system according to claim 1, wherein said first and said second sensing means comprise load cells.

* * * * *